UNITED STATES PATENT OFFICE.

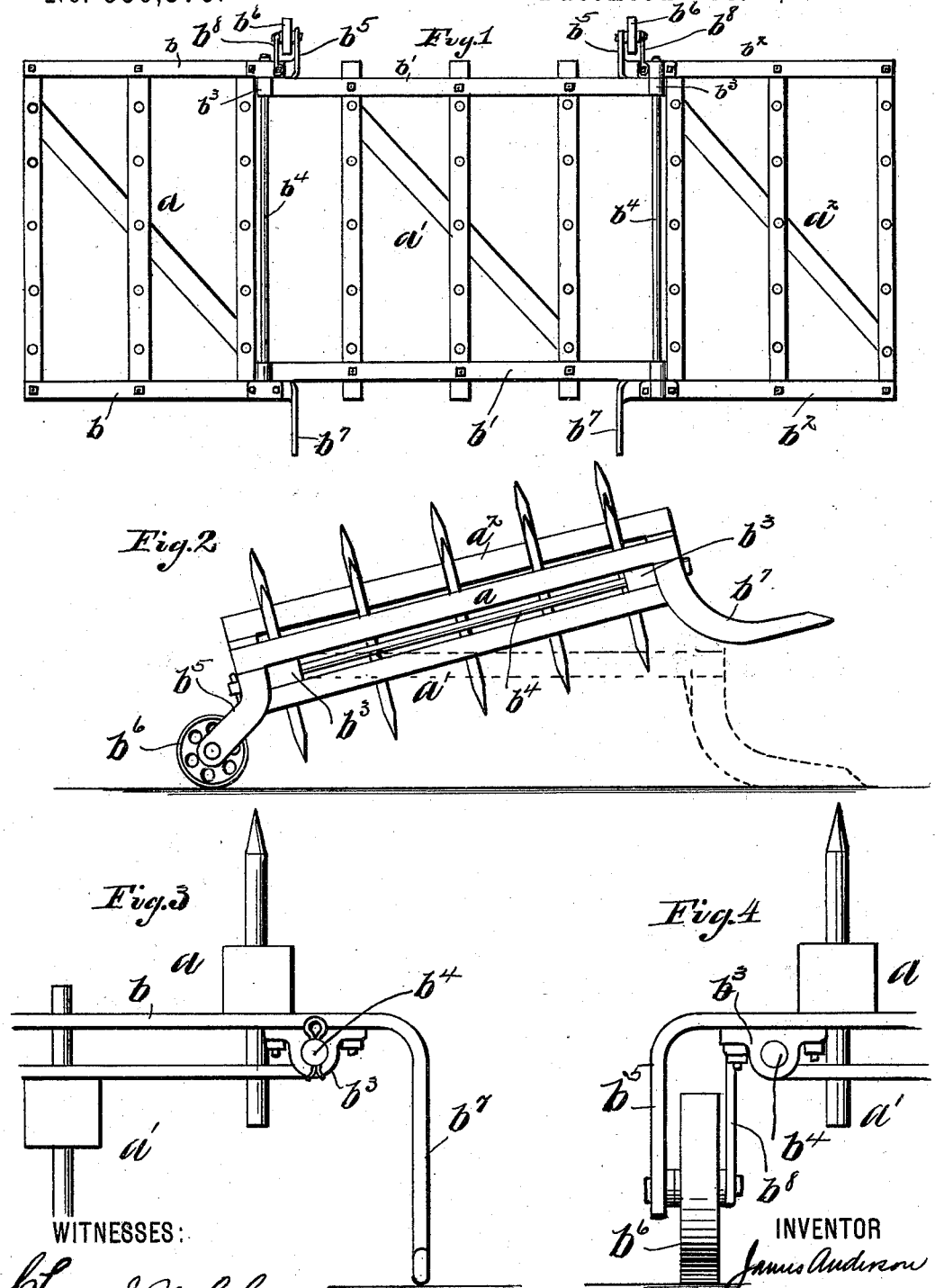

JAMES ANDERSON, OF ANDERSON, ASSIGNOR TO THE BROWN-QUINN HARDWARE COMPANY, OF WASHINGTON COURT HOUSE, OHIO.

ROLLER-TRUCK HARROW.

SPECIFICATION forming part of Letters Patent No. 550,576, dated December 3, 1895.

Application filed October 12, 1894. Serial No. 525,742. (No model.)

*To all whom it may concern:*

Be it known that I, JAMES ANDERSON, a citizen of the United States, residing at Anderson, in the county of Ross and State of Ohio, have invented certain new and useful Improvements in Roller - Truck Harrows, of which the following is a specification.

My invention relates to improvements in harrows, and it especially relates to the construction of harrows in relation to their transportation, the object of my invention being to provide a harrow of simple construction which may be readily folded into compact shape for transportation, either from place to place when ready for use, or in transportation from the manufacturer to the consumer.

My invention consists in the various constructions and combinations of parts hereinafter described, and pointed out in the claims.

In the accompanying drawings, Figure 1 is a plan view of a harrow embodying my invention, shown in position for use. Fig. 2 is an end elevation of the harrow folded for transportation and in such position as will adapt it to be moved in the nature of a truck. Figs. 3 and 4 are detail views of some of the features of the same when folded.

Like parts are represented by similar letters of reference throughout the several views.

My improved harrow is made in sections $a$ $a'$ $a^2$, preferably three in number, and formed of rectangular shape in the usual way, any desired construction of frame and teeth being employed. In the drawings I have shown a construction in which parallel connecting-bars $b$ $b$ $b'$ $b'$ $b^2$ $b^2$ are employed for connecting the harrow-beams in which the teeth are supported. These connecting-bars $b$ $b'$ on the center section $a'$ are extended at each side and provided with suitable bearings $b^3$, through which is extended a rod $b^4$. The connecting-bars $b$ $b^2$ at the front of the harrow are extended and bent upwardly and forwardly to form a supporting-arm $b^5$, in which is journaled a roller $b^6$. Those bars $b^2$ at the rear of the harrow are extended upwardly and backwardly to form projections $b^7$, which are adapted to act in the capacity both as handles and as runners in the different positions which the harrow may occupy. These projections and rollers are so constructed that when the side sections are turned or folded upon the middle section in the usual way for transportation the said rollers and runners stand below the teeth of the middle section and elevate the harrow above the ground. In this position the harrow is ready for transportation from place to place of its operation, either by the team which draws it or by hitching it to a suitable vehicle. In either case the rollers and runners serve the purpose of supporting the teeth above the ground in an inoperative position. The use of the runners in connection with the rollers prevents the harrow from running onto the team or vehicle in going downgrade, while at the same time the rollers and runners, as described, serve as a means for readily handling the harrow by hand and moving it from place to place when folded by elevating the rear end so as to bring the weight of the harrow on the rollers and by the use of the handles transport the same in the nature of a truck in the position shown in Fig. 2. When in an operating position, the runners or projections $b^7$ also serve for handles for operating the sections, raising and lowering the same to dislodge foreign matter, or for such purpose as is necessary in the practical operation of the harrow.

I have shown the rollers supported in standards formed integral with the connecting-bars. When so constructed, I find it desirable to employ an additional brace $b^8$, which extends from the journal on the roller to a point on said bar. It is obvious, however, that this construction may be modified and the standard may be made in a separate piece, bolted or otherwise secured to the connecting-bar or to any other suitable portion of the frame.

The projections $b^7$, which form the combined runners and handles, may also be constructed in any suitable and desirable manner.

If desired, the supporting-rollers may be formed in the nature of caster-wheels instead of having rigid supports, as shown in the drawings.

Other simple modifications which will readily suggest themselves to a mechanic skilled in the art may also be made without departing from the spirit of my invention.

Having thus described my invention, I claim—

1. A roller truck harrow consisting essentially of three sections formed of connecting beams and suitable teeth, connecting bars extending from said beams and journaled on a suitable rod, the side bars being formed integral with projections extending upwardly and outwardly from said sections, as described, rollers secured to the projections at one end of said sections and handles on the other projections, said handles and rollers respectively being adapted to support said harrow when folded, substantially as described.

2. A harrow having projections at one end and extended handles at the other end, wheels or rollers journaled on said projections at one end of said harrow substantially in line with said handles, the wheels and handles being adapted to support the respective ends of said harrow when folded, and the arrangement being such that the harrow may be elevated on the wheels by lifting on said handles, and the harrow thus operated in the nature of a truck, substantially as specified.

In testimony whereof I have hereunto set my hand this 29th day of September, A. D. 1894.

JAMES ANDERSON.

Witnesses:
ISAIAH H. MCCORMICK,
R. SWINEHART,
JOHN C. ENTRIKIN.